United States Patent [19]
McLauchlin
[11] Patent Number: 4,832,995
[45] Date of Patent: May 23, 1989

[54] LAMINATED CERAMIC TILE PANEL AND PROCESS FOR PRODUCING SAME

[76] Inventor: Dennis A. McLauchlin, 6180 College St., Beaumont, Tex. 77707

[21] Appl. No.: 911,372

[22] Filed: Sep. 25, 1986

Related U.S. Application Data

[63] Continuation-in-part of Ser. No. 789,730, Oct. 21, 1985, abandoned.

[51] Int. Cl.4 .......... B32B 3/14
[52] U.S. Cl. .......... 428/49; 52/388; 156/269; 156/307.3
[58] Field of Search .......... 52/388, 389; 156/269, 156/307.3; 428/47, 48, 49

[56] References Cited

U.S. PATENT DOCUMENTS

| | | | |
|---|---|---|---|
| 738,704 | 9/1903 | Semmer . | |
| 2,020,455 | 11/1935 | Bulter | 72/22 |
| 2,487,254 | 11/1949 | Mahoney | 117/6 |
| 2,887,867 | 5/1959 | Burchenal et al. | 428/47 X |
| 2,893,888 | 7/1959 | Yarotsky | 117/6 |
| 2,931,751 | 5/1960 | Du Fresne | 154/118 |
| 2,991,189 | 7/1961 | Rickert | 117/6 |
| 3,056,224 | 10/1962 | Almy et al. | 428/48 X |
| 3,113,900 | 12/1963 | Abernethy et al. | 428/48 X |
| 3,125,831 | 3/1964 | Marsch et al. | 428/47 X |
| 3,139,371 | 6/1964 | Sisko | 161/37 |
| 3,150,022 | 9/1964 | Vida | 156/73 |
| 3,362,119 | 1/1968 | Murphy | 52/389 X |
| 3,444,033 | 5/1969 | King | 428/49 |
| 3,521,418 | 7/1970 | Bartoloni | 428/49 X |
| 3,521,418 | 7/1970 | Bartoloni | 52/318 |
| 3,646,180 | 2/1972 | Winnick | 428/49 X |
| 3,817,012 | 6/1974 | Wack et al. | 428/49 X |
| 3,950,581 | 4/1976 | Maurin | 428/49 |
| 3,962,504 | 6/1976 | Sherwin | 428/40 |
| 4,112,173 | 9/1978 | Roudebush et al. | 428/215 |
| 4,174,419 | 11/1979 | Nienart | 428/251 |
| 4,257,834 | 3/1981 | Iida et al. | 156/73.6 |
| 4,374,888 | 2/1983 | Bornslaeger | 428/218 X |
| 4,380,563 | 4/1983 | Ayotte | 428/40 |
| 4,415,616 | 11/1983 | Angioletti | 428/48 |
| 4,423,100 | 12/1983 | Witman | 428/42 |
| 4,522,855 | 6/1985 | Bethea | 428/49 |
| 4,543,765 | 10/1985 | Barrett | 52/390 X |
| 4,546,674 | 10/1985 | Clark et al. | 428/413 X |
| 4,567,704 | 2/1986 | Bernett et al. | 52/309.3 |

*Primary Examiner*—Henry F. Epstein
*Attorney, Agent, or Firm*—Arnold, White & Durkee

[57] ABSTRACT

A laminated panel for use as a wall or floor covering is disclosed which comprises a pre-grouted layer of ceramic tiles bonded to a fiber-reinforced, water-impervious backing layer. A removable facing layer is adhered to the front face of the panel to complete the laminate. The facing layer imparts increased strength and rigidity to the panel during shipping, handling, and installation and permits the panels to be cut using ordinary carpentry tools without damaging the ceramic tiles.

29 Claims, 2 Drawing Sheets

LAMINATED CERAMIC TILE PANEL AND PROCESS FOR PRODUCING SAME

CROSS-REFERENCES TO OTHER APPLICATIONS

This application is a continuation-in-part of my prior filed copending application, Ser. No. 789,730, which was filed Oct. 21st, 1985 and now abandoned.

BACKGROUND OF THE INVENTION

1. Field of the Invention

This invention relates to prefabricated ceramic tile panels for use as wall or floor coverings and a process for manufacturing such panels. The invention is a laminate, one layer of which comprises an array of grouted or caulked ceramic tiles.

2. The Prior Art

Ceramic tile has long been a highly desired facing material for walls, floors, counter tops, shower stalls, and the like. It is attractive, durable, waterproof, fireproof, and easy to clean. Tiles are available in a wide variety of sizes, shapes, colors, patterns, textures, and surface finishes. They are uniquely suited to a variety of applications ranging from decorative trim in the home to hospital operating rooms.

Ceramic tile per se is relatively inexpensive, being made essentially from clay minerals fired at high temperature. Not so its installation. The conventional construction of a ceramic tile wall, for example, begins with the installation of metal lath over a vapor barrier secured to the studding. Next, a scratch coat of mortar is applied to the lath followed by an accurately leveled mortar bed for the tile. Should the scratch coat be uneven, a separate, additional leveling layer of mortar may be required. When the mortar is sufficiently set, the tiles are set in tile cement, one by one. Individual tiles must be cut using special equipment and tools to fit them to spaces requiring less than a full tile or to fit them around fixtures and the like.

A somewhat less expensive, and less desirable, method of installing ceramic tile is the so-called "thin-set" technique. This method involves the application of ceramic tile directly over substrate. Various tile adhesives or mastics are used to mount the tile to the substrate. However, unlike the lath-supported cement of "mud-set" installations, these adhesives provide no moisture barrier.

Tile setting is a skilled occupation, commanding high wages. The level of skill required, and the time-consuming nature of conventional tile installation render the process very expensive. As a result, where once entire baths were tiled, now, commonly ceramic tile is used only in those areas where it is nearly indispensable (e.g., tub surrounds and shower stalls). Unfortunately, due to the high cost of tile installation, some builders have attempted installation shortcuts in a misguided effort to save money. It is not uncommon to find tiles cemented directly to gypsum wallboard. Such improper installation techniques frequently result in expensive repairs for the homeowner when moisture eventually finds its way into the wall.

Given this situation, it is not surprising to find a number of proposed solutions to the problem in the prior art. The concept of a prefabricated tile panel which would not require any tile setting at the installation site has long been considered. However, the tile panels previously described have all proved unsatisfactory for reasons such as insufficient strength, moisture susceptibility, excessive weight, complexity of installation, and high cost. And none have met with commercial success to any significant extent.

Early attempts to solve the problem of the high cost of installed ceramic tile included such concepts as mounting ceramic tile on a backing sheet of slate. More recently, tile panels with a plastic foam core have been proposed. Wack et al., U.S. Pat. No. 3,817,012, describes a prefabricated ceramic tile building panel. The panel includes a pre-grouted layer of lightweight (3/16") ceramic tile elements bonded to a foam backer formed from rigid closed-cell plastic foam. A fiber reinforced paper backing sheet (104 in FIGS. 4—7) is attached to the rear surface of the foam backer. The preferred material for the foam backer is polyurethane, which is foamed in place in a mold. The foaming process bonds the foam to the rear surface of the tiles. A fiber reinforced sheet is added to the rear surface of the foam backer to further strengthen the panel and permit the use of a relatively thin foam layer. The preferred material for the backing sheet is a kraft paper reinforced by a glass fiber scrim (106 in FIG. 7) which is affixed to the inner side of the paper by a thin polyethylene coating. Specialized installation hardware is required to mount the tile panels and the various cove-shaped tile elements necessary for corner assemblies.

Angioletti, U.S. Pat. No. 4,415,616, describes a monolithic slab with a ceramic tile surface, polymeric grouting material between the tiles, and a synthetic resinous plate with a reinforcing fabric embedded in its rear face. The resinous plate has shavings distributed throughout the plastic. The product, intended as a flooring material which contributes to the sound-proofing and waterproofing of the resulting floor, is preferably produced in a mold formed by a box-shaped container. The plate is preferably a microcellular polyurethane foam with an insulating material such as wood shavings or a vulcanized elastomer embedded in the matrix. A fabric scrim or net is embedded in the face of the plate opposite the tiles.

Winnick, U.S. Pat. No. 3,646,180, describes a foam-cored wall panel with two fiberglass layers. The wall panel has a foam core between two fiberglass layers. One such layer bonds a layer of ceramic tiles to the foam core. Preferably, relatively thin tiles are employed so that the panel can be suspended from the building studs as a unit. Flexible grout may be installed in the cracks between tile on the front or exposed tile layer surface of the panel. The panels are formed by placing a layer of tile face down in a mold and taping the joints formed by their abutting edges with adhesive tape. Next, a fiber-glass layer is applied to the tape-covered rear surface of the tile layer. The fiberglass material includes an adhesive or bonding agent such as a polyester resin which effects adhesion to the tile layer. To form the core, a closed cell foam plastic composition of polyurethane, polyethylene, or a polystyrene is then introduced into the cavity over the cured fiberglass layer. After curing (at a controlled temperature) the foam core is smoothed and leveled by sanding. A second fiberglass layer carrying mounting means for anchoring or securing the wall panel to conventional construction is then applied to the exposed core surface. The panel thus comprises layers of tile, adhesive tape, fiberglass, foam core, and fiberglass.

Murphy, U.S. Pat. No. 3,362,119, describes a four-layer, pre-grouted tile panel. The panel has a layer of tiles, a layer of adhesive, a rigid base sheet layer, and a deformable backing layer. The tiles may be ceramic, and the base sheet is preferably asbestos fiber embedded in mineral cement. The readily deformable backing layer (15 in FIG. 3), preferably a plastic foam, comprises the rear layer of the panel. The purpose of the foam backing is to permit the panels to conform to irregular surfaces to which the panel is applied without deforming the rigid substrate. Some tiles are not assembled to the rigid base sheet to permit fasteners to be forced through the base sheet and the backing into the supporting surface or structural member.

Bartoloni, U.S. Pat. No. 3,521,418, also describes a panel with a backing support made from fibrous material impregnated by a plastic resin. The gaps between opposing edges of adjacent tiles are filled with and closed by the resin. The fibrous backing support in its original condition is approximately one-fourth inch thick. After the backing support is impregnated with the plastic resin, its thickness is reduced by approximately one half. The article described is characterized as a "monolithic slab." This slab comprises a plastic resin interposed between the decorative tile facing and the backing support made from the fibrous material. A plurality of thin, elongated reinforcing strips or rods made from fiber glass may be immersed in the resin to provide reinforcement for the backing support.

The panels described in Bartoloni are mounted to wall studs of a building structure by means of nails or other fastening devices. Like the panels described in Murphy, one side of the backing support is provided with a plurality of untiled areas corresponding to the size of a tile. Each of these areas has a hole therein to permit the mounting of the panel. After the panels are mounted, the untiled areas are covered by tiles.

Ceramic tile panels are also used in other arts. King, U.S. Pat. No. 3,444,033, describes a substitute for conventional metal armor. Ceramic tiles are adhesively applied to a laminated base, and are covered by a woven fabric. The base consists of a number of fibrous reinforcing layers embedded in a resilient polymeric composition. Typically, the base may be formed of layers of fiberglass in an epoxy or phenol-formaldehyde resin mixed with an acrylonitrile-butadiene copolymer or a polyurethane rubber cured under heat and pressure. The woven fabric may be of nylon or polyester. When the armor is struck by a bullet, this overlying fabric is said to retain the shattered pieces of the tile and prevent the fragments from coming off in the direction from which the bullet was fired. Between the individual tiles are "separators" which may be composed of paper, masking tape, cardboard, rubber and the like. Their purpose is to avoid the transmission of shock from one tile to another.

Thus, it will be appreciated that the prefabricated ceramic tile panels known in the art prior to this disclosure all relied on a core, commonly of plastic foam, or a relatively thick backing layer to impart some measure of structural strength and rigidity to the panels. These cores substantially increase the thickness of the panels, and this in turn necessitates special mounting hardware for installation.

SUMMARY OF THE INVENTION

The present invention comprises a thin, lightweight ceramic tile panel which greatly simplifies and reduces the cost of installing ceramic tile walls, floors, shower stalls, and the like while providing the advantages of both "thin-set" and "mud-set" tile installations. The invention further comprises a method of making such a panel.

The ceramic tile panels of the invention include a plurality of ceramic tiles pre-assembled and mounted on a water-resistant, non-stretchable backing sheet. The tile panels further include a non-stretchable facing layer which is releasably adherent to the faces of the tiles. The spaces between the tiles are filled with grout to seal these spaces against moisture, etc. The term "grout" should be understood to include both the conventional thin, cementitious mortar used for filling joints in masonry as well as chemicals that solidify, such as polyurethanes, room temperature vulcanizing silicones, other elastomers, plastics, and the like. The panels normally feature a regular pattern of substantially square tiles in a side-by-side, laterally spaced rectangular array; however, a wide variety of tile shapes and trim pieces are contemplated.

The ceramic tiles of the invention are preferably thinner and lighter than common ceramic tiles. Thus, the tiles will generally be less than one-fourth inch thick, and preferably about one-eighth to three-sixteenths inch thick. The light weight of the tiles makes it possible for relatively large panels of such tiles to be assembled and handled with comparative ease. The strength imparted to the panels by the sandwich effect of the facing and backing layers overcomes the disadvantages of thin ceramic tile resulting from its relatively fragile nature.

The facing and backing layers of the laminated panel may be made of a variety of materials. The sheets themselves will normally be flexible, but it is important that they be substantially non-stretchable. This quality is important because the facing and backing sheets on each tile panel co-act to render the panel rigid enough to be readily handled and worked. It has been found that without the front facing layer the uninstalled panels can be flexed toward the backing layer—i.e., as viewed from the rear, the back surface of the panel becomes concave upon bending. Such flexing is detrimental to the integrity of the grout between the tile elements and the tile-to-backing sheet bond.

Working of the tile panels for example, may include cutting or drilling with tools such as portable electric circular saws, table saws, sabre saws, drill bits, hole saws, and the like. Preferably, carbide-tipped circular saw blades are used to cut the panels to the desired size. The presence of the two surface sheets, especially the facing sheet, enables such working to be carried out with very little breaking, chipping, or other damage to the tile elements.

An especially effective facing sheet for use with the panels of the invention is simply kraft paper coated with a contact adhesive which enables the facing sheet to be peeled from the tile panel. Ideally, the affinity of the adhesive for the facing sheet will be greater than that of the adhesive for the front surface of the tile elements, thereby permitting a clean release of the facing sheet—i.e., the adhesive remains substantially on the facing sheet rather than on the tile elements. It will be apparent, however, that a variety of materials may be used for this service. As noted earlier, the material should be substantially non-stretchable, and it should be readily peelable or otherwise removable from the tile panel. It is preferably scuff-resistant to protect the surfaces of the tiles. It is also preferably capable of receiving legends, designs, printing, instructions and the like to facilitate work on the tiles and to carry trademarks, etc. It should also resist penetration by paint so that it will function as a paint mask during finish work after the tile panels are installed. In addition to paper made from sulfate process (kraft) pulp, a paper-like product produced from a synthetic pulp based on polyolefins (styrene copolymer fibers) is an especially suitable facing material owing to its great strength (e.g., TYVEK brand spunbonded olefins produced by E. I. duPont de Nemours & Co.).

An especially effective backing sheet has been found to be woven polyester fabric impregnated with a water-resistant or waterproof synthetic resin. The tiles are preferably positioned on the impregnated fabric before the resin has cured and are bonded directly to the fabric during the curing process. An especially suitable resin has been found to be an unsaturated polyester resin manufactured by Alpha Chemical & Plastics Corporation, Newark, N.J. 07105. This resin is cured using a peroxide catalyst. For efficient manufacture, it is most preferable that the curing process be such that its rate can be significantly increased by elevating the temperature of the resin/catalyst mixture.

It will be apparent that a number of suitable backing sheets may be employed in the invention. It is essential that the sheets be strong, substantially non-stretchable, substantially water-resistant, chemically stable, and capable of being bonded to the tiles as well as to plaster, wood, drywall panels [gypsum board; sheetrock], etc. with conventional construction adhesives. As mentioned above, woven polyester fabric is an especially preferred component of the backing sheets; however, other fabrics or reinforcing agents considered suitable include fiberglass roving, and graphite, aramid, or carbon fibers, or any combination thereof. Especially preferred is a fiberglass/polyester combination.

Synthetic resins suitable for impregnating the backing sheets include unsaturated polyester, phenolic, epoxy, and silicone resins.

In general, the resins should possess the same general characteristics as the backing sheets proper—i.e, the cured resin should be strong, substantially non-stretchable, substantially impervious to moisture, function as an adhesive to bond the back surfaces of the ceramic tiles to the backing sheet, and be capable of being bonded to common wall surfaces and the like with conventional construction adhesives such as Liquid Nails (Reg. TM) manufactured by SCM Macco Adhesives of Wickliffe, Ohio, and the MD-200 and MD-400 brands of styrene/-butadiene rubber-based adhesives manufactured by Macklanburg-Duncan Company, Oklahoma City, Okla. 73125. It is preferred that the resins be relatively quick-setting at ambient or moderately elevated temperatures so as to facilitate manufacture of the tile panels.

DETAILED DESCRIPTION OF THE DRAWINGS

Figures 1, 2, 3:
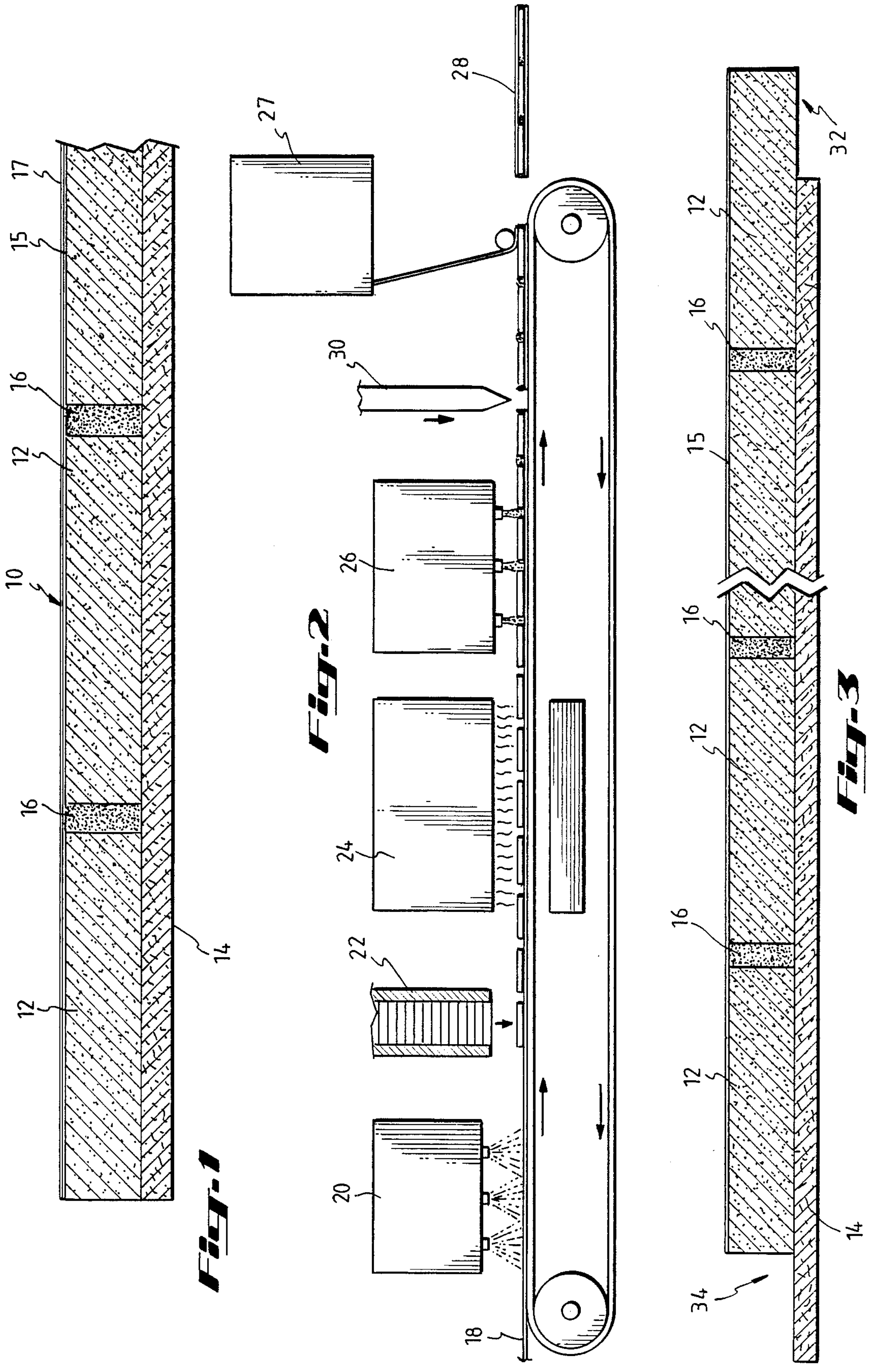
FIG. 1 is a cross-sectional view of a portion of a tile panel of the present invention.
FIG. 2 is a schematic representation of a continuous process for manufacturing the tile panels of the present invention.
FIG. 3 is a cross-sectional view of an optional embodiment of the tile panels of the invention showing in detail the edges of such a panel.

The invention will best be understood by referring to the drawings. FIG. 1 shows a portion of a tile panel 10 in cross section. Individual tile elements 12 are supported on a fiber-reinforced backing layer 14. Grout 16 or elastomeric caulking material fills the gaps between the edges of adjacent tile elements. The releasable facing sheet 15 is shown attached to the front face of the panel with adhesive 17.

FIG. 2 schematically illustrates a continuous method of fabricating the tile panels on an endless belt. Reinforcing fabric 18 for the backing layer is fed onto a belt coated as is well known in the art to prevent bonding of the backing layer resin to the belt. Resin impregnating means 20 applies catalyzed resin to fabric 18. Tile positioner 22 applies a planar array of ceramic tile elements to the resin-impregnated fabric before the resin has cured to any significant extent. The resin-impregnated fabric bearing the ceramic tile elements next passes through oven 24 which raises the temperature of the catalyzed resin to increase its curing rate. As the resin cures, it bonds the rear surface of the tile elements to the backing layer. The substantially cured backing layer with bonded tile elements next moves past grouter 26 which deposits conventional tile grout or an elastomer such as silicone rubber as a sealant and filler in the spaces between the edges of adjacent tile elements. An especially preferred sealer/filler for this application is MD-35 brand water-based acrylic latex sealant manufactured by Macklanburg-Duncan Company, Oklahoma City, Okla. 73125.

Cutter 30 sections the grouted tile panel into desired lengths. Next, the adhesive-coated facing layer is applied to the sectioned panels by front laminator 27 to produce individual tile panel 28. Alternatively, the front laminator may be positioned on the conveyor ahead of cutter 30 so that the front facing layer is included in the laminate prior to its being cut into panels of desired length. A kraft paper pre-coated with a pressure-sensitive adhesive available from Spectape of Texas, Addison, Tex. 75001 is particularly suitable for use in the front laminator to provide the front facing layer.

FIG. 3 shows in detail the edges of an optional embodiment of the tile panels of the present invention. A portion of the backing layer 14 extends beyond the tile elements on one edge (34) of the panel, while on the opposite edge (32), the tile elements overhang the backing layer by an equal distance. This permits abutting tile panels to be joined together in such a way such that the joint between the backing layers of adjacent tile panels does not coincide with the joint between the tile elements. Thus, the moisture barrier which is provided by the installation of the panels of the present invention will remain substantially intact even if the grouted joint between the tile elements of adjacent panels should fail.

It should be appreciated that the panels herein disclosed may be provided with two edges with overhanging portions of the backing layer and two with overhanging tile elements. With such panels, large sections of wall or floor may be tiled using a plurality of tile panels, and each joint between adjacent panels will have the benefit of the overlapping feature described above.

Alternatively, the panels of the present invention may be manufactured individually. Ceramic tiles are placed face down within the confines of a frame designed to hold the loose tiles in a rectangular array. Gaps are left between the edges of adjacent tiles to permit the subsequent insertion of grout. As is well known in the art, the individual tiles may have a plurality of protuberances about their peripheries to aid in sizing the gap.

Reinforcing fabric for the backing layer is then placed over the exposed rear surfaces of the tile elements in the array. A catalyzed resin is then applied to the fabric, saturating it and extending through it to contact the tiles. As the resin cures it bonds the backing layer to the tiles. This process may be accelerated by the application of heat to raise the temperature of the resin/catalyst mixture thereby increasing its cure rate.

When the resin of the backing layer has substantially cured, the backing layer with the tile elements bonded to it is inverted, exposing the front face of the tile elements. Grout or other suitable caulking material is applied to the spaces between the tiles.

Finally, when the grout has set, the releasable facing layer is applied to the finished face of the tiles to complete the laminate. This may be done by rolling the material of the facing layer with pre-applied adhesive onto the exposed tile layer.

In use, the tile panels are mounted to conventional floor or wall surfaces using construction adhesives of the type previously mentioned applied in about a 10-mil thickness. To provide a substantially water-impervious installation, it is important that the joint or seam between adjacent tile panels be properly sealed. If the adjacent panels have both the backing layer and ceramic tile layers extending to the edge (i.e., are not of the edge type shown in FIG. 3), the joint may be treated as follows: first, a strip of fiberglass roving approximately two inches wide and the same length as the edges of the panels to be joined is saturated in a mixture of epoxy resin and hardener; next, the saturated tape is applied to the wall surface, centered on the line defining the location of the joint; finally, before the epoxy has set, the tile panels are installed over the epoxy-saturated tape.

If the edges of the tile panels to be joined are of the type shown in FIG. 3, it is only necessary to apply an epoxy adhesive (or other water-resistant adhesive) to the front face of the exposed backing layer or the rear face of the exposed tile layer prior to installing the panels.

At inside corners, such as would be found in tub surrounds and shower stall installations, it is recommended that a water-resistant caulk be first applied to the corner. A particularly suitable product for this application is a tape-like material comprising a mineral filled butyl rubber and having a facing of MYLAR polyester film such as "Press 'n Caulk" manufactured by Chemesco, Kansas City, Mo. 64130

While one specific embodiment of the invention has been disclosed herein, it should be understood that this disclosure is made by way of illustration rather than limitation. Numerous changes may be made by those skilled in the art, particularly with reference to the dimensions, materials and configuration disclosed herein. Changes of this nature would not depart from the spirit of the invention or the scope of the appended claims.

What is claimed is:

1. A laminated ceramic tile panel comprising:
a flexible, substantially non-stretchable, water impervious backing layer;
a tile layer comprising a planar array of ceramic tiles bonded on their back surfaces to the baking layer; and,
a flexible, substantially non-stretchable facing layer releasably bonded to the front surfaces of the tiles of the tile layer.

2. A laminated ceramic tile panel as recited in claim 1 wherein the backing layer is a fiber-reinforced synthetic resin.

3. A laminated ceramic tile panel as recited in claim 2 wherein the resin is selected from the group consisting of unsaturated polyester resin, phenolic resin, epoxy resin, and silicone resin.

4. A laminated ceramic tile panel as recited in claim 2 wherein the reinforcing fiber is selected from one or more members of the group consisting of polyester fibers, graphite fibers, aramid fibers, carbon fibers, and fiberglass fibers.

5. A laminated ceramic tile panel as recited in claim 4 wherein the fibers are woven into a fabric.

6. A laminated ceramic tile panel as recited in claim 1 wherein the facing layer is kraft paper.

7. A laminated ceramic tile panel as recited in claim 1 wherein the facing layer is formed of spunbonded olefins.

8. A tile panel as recited in claim 1 wherein the tile layer and facing layer overhang the backing layer on one edge of the panel and the backing layer overhangs the tile layer and facing layer on the edge of the panel opposite the edge whereon the tile and facing layers overhang the backing layer.

9. A laminated ceramic tile panel as recited in claim 2 wherein the resin of the backing layer bonds the tiles of the tile layer to the backing layer.

10. A laminated ceramic tile panel as recited in claim 1 wherein the tiles are spaced from one another and the spaces between adjacent tiles in the tile layer are filled with grout.

11. A laminated ceramic tile panel as recited in claim 10 wherein the spaces between adjacent tiles in the tile layer are filled with an elastomer.

12. A laminated ceramic tile panel as recited in claim 11 wherein the elastomer is silicone rubber.

13. A process for producing a laminated ceramic tile panel comprising:
placing individual ceramic tiles into a substantially rectangular array, leaving spaces of approximately one-sixteenth inch between adjacent tiles;
layering a reinforcing fabric over the back surfaces of the tiles in the array;
saturating the reinforcing fabric with a catalyzed resin to form a backing layer and to simultaneously bond the reinforcing fabric to the tiles;
substantially curing the catalyzed resin of the backing layer;
placing grout in the spaces between adjacent tiles; and,
applying a flexible, substantially non-stretchable, releasable facing layer over the front faces of the tiles.

14. A process for producing a laminated tile panel as recited in claim 13 wherein the reinforcing fabric is made of fibers selected from the group consisting of polyester fibers, graphite fibers, aramid fibers, carbon fibers, and fiberglass fibers.

15. A process for producing a laminated tile panel as recited in claim 13 wherein the catalyzed resin is selected from the group consisting of unsaturated polyester resin, phenolic resin, epoxy resin, and silicone resin.

16. A process for producing a laminated tile panel as recited in claim 13 wherein the grout is an elastomer.

17. A process for producing a laminated tile panel as recited in claim 13 wherein the grout is silicone rubber.

18. A process for producing a laminated tile panel as recited in claim 13 wherein the grout is a polyurethane.

19. A process for producing a laminated tile panel as recited in claim 13 wherein the substantially non-stretchable facing layer is kraft paper.

20. A process for producing a laminated tile panel as recited in claim 13 wherein the substantially non-stretchable facing layer is formed of spunbonded olefins.

21. A process for producing a laminated tile panel as recited in claim 13 wherein the curing of the catalyzed resin is accelerated by the application of heat.

22. A continuous process for producing a laminated ceramic tile panel on an endless belt, which resists the adhesion of synthetic plastic resins, comprising:

(a) feeding a reinforcing fabric onto the endless belt;

(b) passing the reinforcing fabric on the endless belt through an impregnating zone wherein the fabric is saturated with a catalyzed synthetic plastic resin;

(c) passing the resin-saturated fabric through a tile application zone wherein a planar array of ceramic tiles are applied to the resin-saturated fabric;

(d) passing the resin-impregnated fabric with ceramic tiles through an oven which raises the temperature of the catalyzed resin to increase its curing rate and to bond the ceramic tiles to the backing layer comprising the substantially cured, fabric reinforced plastic resin;

(e) moving the substantially cured backing layer with bonded tiles through a grouting zone wherein material is deposited in the spaces between the edges of adjacent ceramic tiles on the panel;

(f) passing the two-layer grouted laminate through a facing layer application zone wherein a substantially non-stretchable facing layer is releasably bonded to the front face of the ceramic tile layer of the laminate thereby forming a three-layer laminate; and (g) moving the three-layer laminate to a cutting zone wherein the laminate is cut into panels of desired size.

23. A laminated panel of ceramic tiles for use as a wall surface or the like which comprises:

a flexible, substantially non-stretchable, water-resistant backing sheet;

a plurality of ceramic tiles bonded on their back surfaces to said backing sheet in a side-by-side, laterally spaced array;

a filler sealing the spaces between said tiles; and, a flexible, substantially non-stretchable facing sheet releasably adherent to the front surfaces of said tiles.

24. The panel of claim 23 in which said facing sheet is a kraft paper.

25. The panel of claim 24 including a contact adhesive between said facing sheet and the front surfaces of said tiles.

26. The panel of claim 23 in which said backing sheet is a fabric impregnated with a synthetic resin.

27. The panel of claim 23 in which said tiles are square, and said array is a rectangular array.

28. A process for making a laminated panel of ceramic tiles which comprises:

bonding the back surfaces of a plurality of ceramic tiles to a substantially non-stretchable, moisture-impervious, backing sheet in a side-by-side, spaced relation;

covering the front surfaces of said ceramic tiles with a flexible, releasably adherent, substantially non-stretchable facing sheet.

29. The process of claim 28 in which the backing sheet is flexible.

* * * * *